(12) United States Patent
Gerell et al.

(10) Patent No.: US 7,661,100 B2
(45) Date of Patent: Feb. 9, 2010

(54) METHOD AND SYSTEM FOR DETERMINING TOTAL CODE EXECUTION TIME IN A DATA PROCESSOR

(75) Inventors: Peter Gerell, Hagersten (SE); Thomas Stromqvist, Solna (SE)

(73) Assignee: Xelerated AB, Stockholm (SE)

( * ) Notice: Subject to any disclaimer, the term of this patent is extended or adjusted under 35 U.S.C. 154(b) by 560 days.

(21) Appl. No.: 10/500,708

(22) PCT Filed: Feb. 6, 2003

(86) PCT No.: PCT/SE03/00199

§ 371 (c)(1),
(2), (4) Date: Feb. 8, 2005

(87) PCT Pub. No.: WO03/067431

PCT Pub. Date: Aug. 14, 2003

(65) Prior Publication Data

US 2005/0166202 A1     Jul. 28, 2005

(30) Foreign Application Priority Data

Feb. 8, 2002    (SE)    .................................. 0200383

(51) Int. Cl.
G06F 9/44    (2006.01)
G06F 9/45    (2006.01)
(52) U.S. Cl. ........................... 717/162; 717/144
(58) Field of Classification Search ................ 717/144, 717/145, 159, 162, 171, 176, 154–157; 370/320
See application file for complete search history.

(56) References Cited

U.S. PATENT DOCUMENTS

| | | | | |
|---|---|---|---|---|
| 5,339,431 A | * | 8/1994 | Rupp et al. ................. | 717/162 |
| 5,430,727 A | * | 7/1995 | Callon ........................ | 370/401 |
| 5,459,854 A | * | 10/1995 | Sherer et al. ................ | 713/1 |
| 5,497,344 A | * | 3/1996 | Okamoto ..................... | 712/26 |
| 5,504,901 A | * | 4/1996 | Peterson ..................... | 717/144 |
| 5,566,170 A | | 10/1996 | Bakke et al. | |
| 5,701,456 A | * | 12/1997 | Jacopi et al. ................. | 707/4 |
| 5,815,723 A | * | 9/1998 | Wilkinson et al. ............ | 712/20 |
| 6,717,933 B1 | * | 4/2004 | Sonning et al. .............. | 370/342 |
| 6,985,454 B1 | * | 1/2006 | Wiedeman et al. ........... | 370/316 |

(Continued)

FOREIGN PATENT DOCUMENTS

EP        0 481 615 A2     4/1992

(Continued)

OTHER PUBLICATIONS

Cheng Song et al. "Optimizing Bul Data Transfer Performance: A Packet Train Approach", ACM Press, ISSN: 0146-4833, year of publication: 1988, pp. 134-145.*

(Continued)

*Primary Examiner*—Anna Deng
(74) *Attorney, Agent, or Firm*—Young & Thompson

(57) ABSTRACT

A method and a processing system for a communications network, including receiving a program code including multiple instructions for the communications network dividing the program into multiple sequences, defining multiple relocation objects, each corresponding to a dependency relationship between two or more of the sequences, and allocating the sequences to a processor instruction memory.

10 Claims, 4 Drawing Sheets

U.S. PATENT DOCUMENTS

Figure 1:
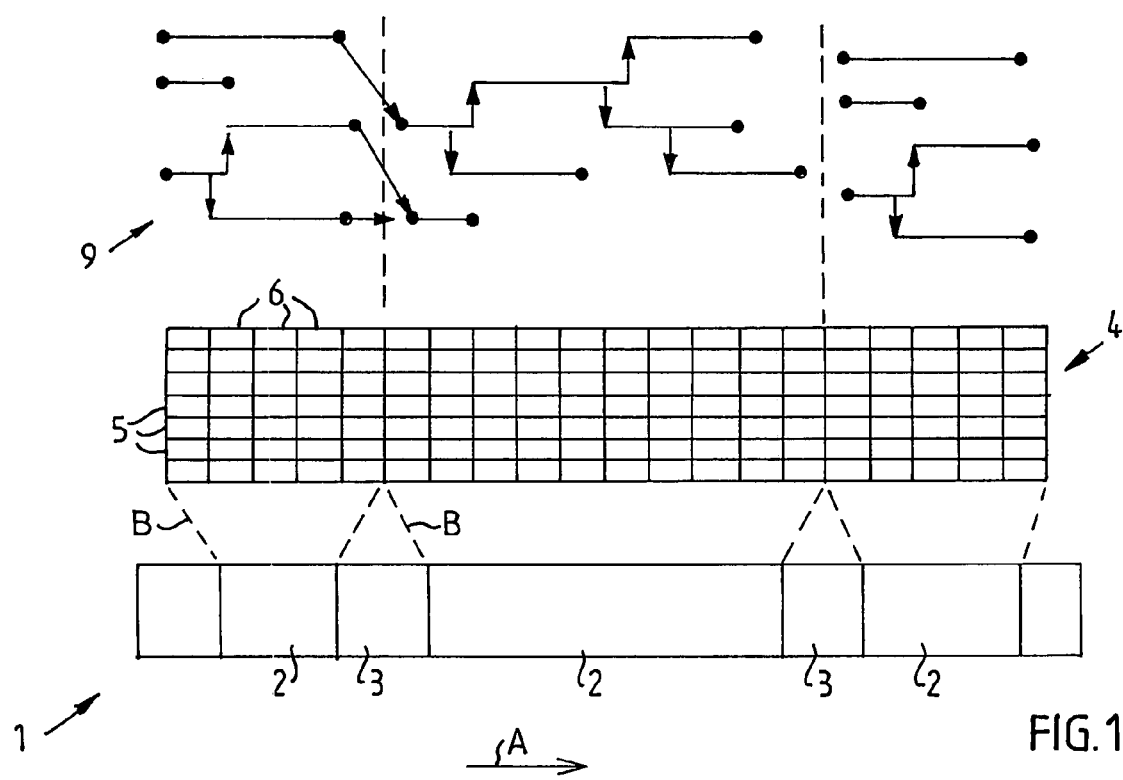

| | | | |
|---|---|---|---|
| 7,007,161 B2* | 2/2006 | Bradley | 713/2 |
| 7,009,967 B1* | 3/2006 | Hariharasubrahmanian | 370/389 |
| 7,069,549 B2* | 6/2006 | Charnell et al. | 717/158 |
| 2001/0036183 A1* | 11/2001 | Melick et al. | 370/389 |
| 2002/0027880 A1* | 3/2002 | Mesiwala | 370/252 |
| 2002/0073407 A1* | 6/2002 | Takayama et al. | 717/154 |
| 2003/0023388 A1* | 1/2003 | Wagner | 702/20 |
| 2003/0120622 A1* | 6/2003 | Nurmela et al. | 706/47 |
| 2003/0187761 A1* | 10/2003 | Olsen et al. | 705/35 |
| 2003/0196004 A1* | 10/2003 | Jackson et al. | 710/5 |
| 2005/0044291 A1* | 2/2005 | Sato et al. | 710/33 |
| 2007/0058656 A1* | 3/2007 | Breslow et al. | 370/437 |

FOREIGN PATENT DOCUMENTS

| | | |
|---|---|---|
| EP | 0 899 656 A2 | 3/1999 |

OTHER PUBLICATIONS

Young Yong Kim et al. "Performance evaluation of packet data services over cellular voice networks", May 1999, Kluwer Academic Publishers, Wireless Network vol. 5, Issue 3, p. 211-219.*

Qiu et al. Dynamic reservation multiple access (DRMA): a new multiple access scheme for personal communication systems (PCS); Jun. 1996, Kluwer Academic Publishers, wireless Networks, vol. 2 Issue 2, pp. 117-128.*

Kim et al. "Modeling multipath fading channel dynamics for packet data performance analysis", Dec 2000, Kluwer Academic Publishers, Wireless Netwroks vol. 6, Issue 6, pp. 481-492.*

Yoo et al. "Finding linking opportunities through relationship-based analysis", May 2000, ACM, pp. 181-190.*

Hartenstein et al. "KressArray Xplorer: a new CAD environment to optimize recongigurable datapath array", Jan. 2000, ACM, pp. 163-168.*

Assmann "Graph Rewrite Systems for program Optimization", Jul. 2000, ACM, vol. 22, Issue 4, pp. 583-637.*

* cited by examiner

METHOD AND SYSTEM FOR DETERMINING TOTAL CODE EXECUTION TIME IN A DATA PROCESSOR

FIELD OF THE INVENTION

The invention refers to a method and a processing system for a communications network.

BACKGROUND OF THE INVENTION

In processor technology, such as data packet processing technology, more specifically in the entering of instructions for the processes, traditional linker algorithms uses large chunks of code, i.e. machine code chunks from an assembler. Traditional linkers also have an object file where the code chunk is stored along with relocation objects. The linkers place many chunks of code sequentially in a memory and link the chunks of code together using of the relocation objects. The codes are optimized by memory utilization, i.e. all codes are placed in sequence.

A disadvantage with known processor assembly-linking algorithms is that it is difficult to meet processing requirements of the processor during programming and compiling. More specifically, it is difficult to include real time requirements of the data processing, when programming and compiling using traditional linker algorithms.

SUMMARY OF THE INVENTION

It is an object of the present invention to present a method and a processing system for a communications network, at which it is easier to meet processing requirements of data processes in the network, during implementation of instructions for the processes.

It is also an object of the present invention to present a method and a processing system for a communications network, at which it is easier to take under consideration real time requirements of the data processing in the network, during programming and compiling of instructions for the processes.

The objects are achieved by a method and a processing system for a communications network.

Dividing the program code into a plurality of sequences, defining, based on the program code, a plurality of relocation objects, each corresponding to a dependency relationship between two or more of the sequences, and allocating the sequences to a processor instruction memory, provides a structure of the codes that make them easy to manipulate in order to meet data processing requirement of the communications network.

Preferably, at least one directed graph is formed, based on at least some of the sequences and at least some of the relocation objects, and a longest execution path through the directed graph is determined. Sequences in the instruction memory can be moved and state preserving operations can be entered, so as to make at least two execution paths equally long. This provides an effective tool for controlling the code in order to meet real time requirements in the communication network. More specifically, the invention facilitates, as opposed to known processor assembly-linking algorithms, often designed to optimize memory utilization, the determination of the total execution time for each alternative execution path, avoiding difficulties in meeting processing time requirements.

BRIEF DESCRIPTION OF THE DRAWING FIGURES

Figure 2:
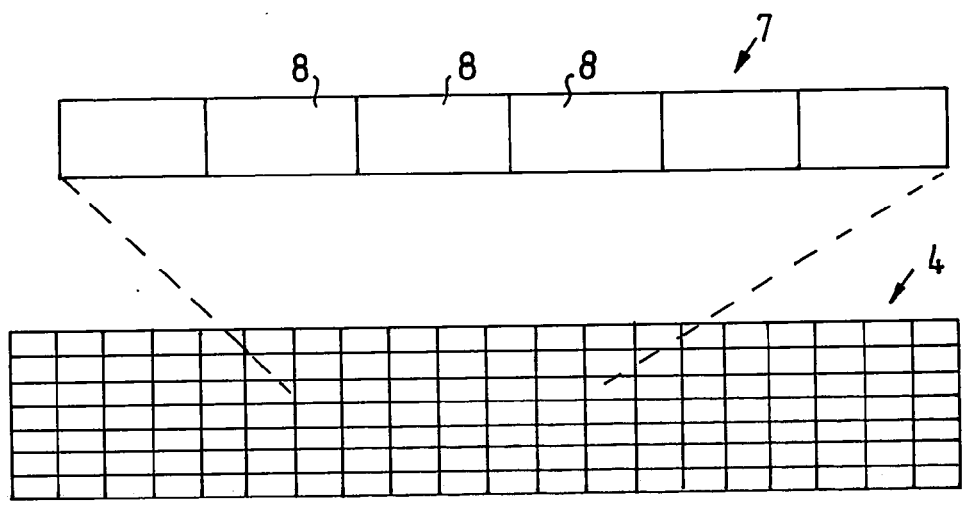
Figure 3:
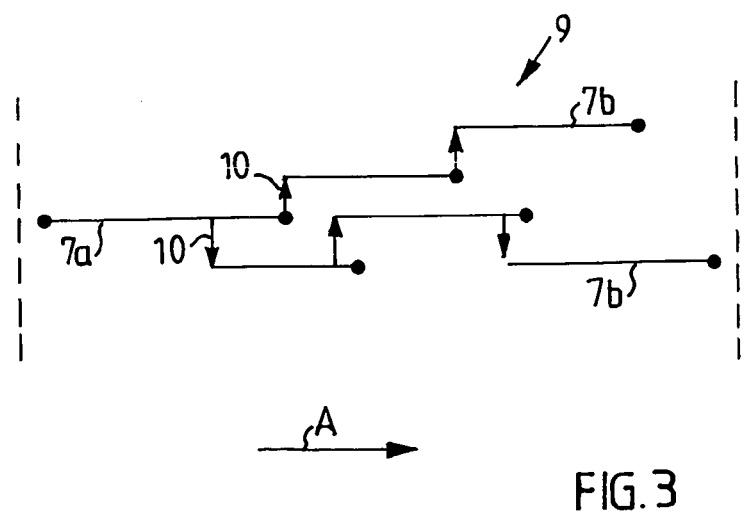

Below, the invention will be described in detail, with reference to the accompanying drawings, in which FIG. 1 shows schematically the structure of an instruction memory, according to a preferred embodiment of the invention, in relation to programmed instructions and a data path, FIG. 2 shows schematically the instruction memory in FIG. 1 and a part of it enlarged, FIG. 3 shows schematically the structure of a program according to a preferred embodiment of the invention, and FIGS. 4-7 show examples of program structures,

DETAILED DESCRIPTION

Here, reference is made to FIG. 1. The processing system according to the invention is adapted to process physical data passing through a processing pipeline 1. The data can be in the form of data packets. The direction of the data stream is indicated by an arrow A. The processing system can be a PISC (Packet Instruction Set Computer), as described in the patent application SE0100221-1. The processing pipeline 1 comprises a plurality of pipeline elements 2. Between the pipeline elements 2 engine access points 3 are located, at which, for example, data packet classification can take place.

The processing pipeline 1 can be adapted to a so called classify-action model. Thereby, in the processing of a data packet, first a classification is performed, e.g. a CAM lookup. A matching classification rule can start an action with an argument. The action can be a process program executed in a pipeline element 2 and that performs a task as a directed graph of sequences starting with a root sequence, as described below. The processing system can be adapted to run many forwarding plane applications simultaneously, e.g. both MPLS and IPv4. The applications can be separated logically, for example by special tags for classification and different sets of actions (packet programs).

The processing system, comprises an instruction memory 4 for storing instructions for the data processing. The instruction memory 4 comprises rows 5 and columns 6. Each pipeline element 2 comprises a number of instruction steps for the data process, whereby each instruction step is allocated to a column 6 in the instruction memory 4. Accordingly, each pipeline element 2 is allocated a certain number of columns as indicated by the broken lines B. The rows 5 each corresponds to an address in the memory 4.

In a method according to a preferred embodiment of the invention, described closer below, an assembler generates sequences 7 of instruction words 8, preferably machine code instruction words, e.g. VLIW instruction words, and a linker place the sequences into the instruction memory 4 and link the sequences together. Referring to FIG. 2, in the memory 4, each sequence occupies memory space, in the same row and in adjacent columns. Each sequence is a row of machine code instruction words that will be executed consecutive. After executing an instruction word the processor will normally execute another instruction word in the next column at the same row.

As depicted in FIG. 1, the processing system comprises a process program, which corresponds to a directed graph 9 of sequences 7 that each perform a certain task on data, e.g. data packets, such as forwarding.

As depicted in FIG. 3, the directed graph starts with a root sequence 7a. It is limited to one pipeline element 2. Each root sequence 7a is a sequence at the beginning of a process program, and can be marked as "Root" in the program. A root sequence 7a can be started as a result of a CAM classification or an instruction in the form of a jump in a sequence in a preceding pipeline element 2. The linker can export a start row of the root sequence so that a run-time software can map action to classification rules.

The directed graph ends in leaf sequences 7b. Each leaf sequence 7b is a sequence that ends with a relocation instruction that the packet program should exit or jump to a sequence in another pipeline element 2. Thus, the linker can link directed graphs, or programs, in different pipeline elements 2, by connecting, or linking, a leaf sequence in one program to a root sequence in another program.

The directed graph 9 comprises branches 10. Each branch 10 is a relocation object that provides information that there is an alternative sequence to jump to at the instruction at which the branch is located. By using a branch 10 the processor can perform a jump to another sequence at another row, but a default branch is executed at the same row and belongs to the same sequence.

A sequence exit can be any of the following: A relocation object instructing a jump to another sequence in the same pipeline element 2, a relocation object instructing a jump to a sequence in a following pipeline element 2, or an instruction to end the program. Any of the two latter alternatives form an exit in a leaf sequence 7b.

The relocation objects result in the process program having a finite number of alternative paths until the program exits in one or many exit points (leafs).

In a method for a communications network according to a preferred embodiment of the invention, the assembler receives a program code, comprising a plurality of instructions for the communications network. The assembler divides the program code into a plurality of sequences 7, e.g. sequences of a PISC code, and defines, based on the program code, a plurality of relocation objects 10, each corresponding to a dependency relationship between two or more of the sequences 7. The assembler forms at least one directed graph 9, based on at least some of the sequences 7 and at least some of the relocation objects 10, the directed graph having one or many roots.

In other words the assembler or "compiler" divides the code into "atomic" tasks, activities or sequences that have dependencies to each other such that they need to be performed in a consequence order.

The directed graph 9 is stored as an object file. The object file comprises a code sequence format and a relocation object format that define the dependencies between the sequences. Each code sequence has a length (a number of instructions).

The directed graph is analyzed. The linker validates that the directed graph consists of one to many partial ordered sets. This means determining the existence of any circle reference by any of the relocation objects 10 between any of the sequences 7.

Preferably, the method comprises the linker validating that the code meet a predetermined time requirement, i.e. hard execution time requirement. This is done with a longest path algorithm over the directed graph, i.e. determining a longest execution path through the directed graph, which includes adding sequence lengths or lengths of partial sequences. In the pipeline processing case the execution time requirement is limited by the number processing stages. In a more general case the time limit can be any hard real-time requirement.

The linker places the sequences in the instruction memory, as described above. The two-dimensional instruction memory 4 allows many alternative execution paths to be stored in parallel. Hence, the program having to be stored as a directed graph.

Figure 4:
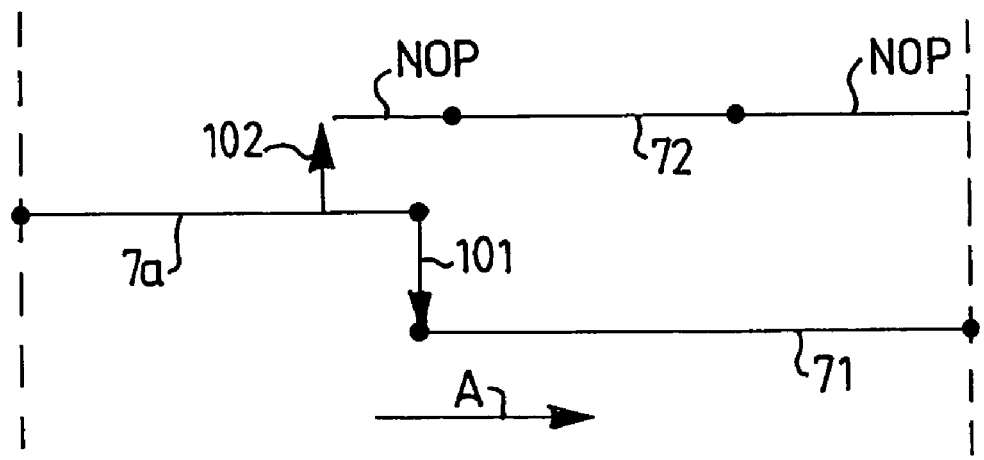

Referring to FIG. 4, the linker moves at least one sequence in the instruction memory and allocates at least one state preserving operation, or no operation instruction, NOP in the instruction memory, so as to make at least two execution path equally long, whereby the length of the at least two execution paths correspond to the longest execution path. As an example, in FIG. 4 the longest execution is determined by the root sequence 7a, a first relocation object 101 and a first leaf sequence 71. An alternative execution path is formed by a part of the root sequence 7a, a second relocation object 102 and a second leaf sequence 72. The alternative execution path has a shorter execution time compared to the longest execution path, due to the second relocation object 102 being located closer to the root of the root sequence 7a than the first relocation object 101, and the second leaf sequence 72 being shorter than the first leaf sequence. The linker moves the second leaf sequence and enters state preserving operations NOP (no operation) before and after the second leaf sequence 72. Alternatively, the second leaf sequence is not moved and state preserving operations NOP are entered after second leaf sequence 72. Thereby, all alternative execution paths become equally long, and the execution time is equal to the longest path for all possible alternative paths.

Figure 5:
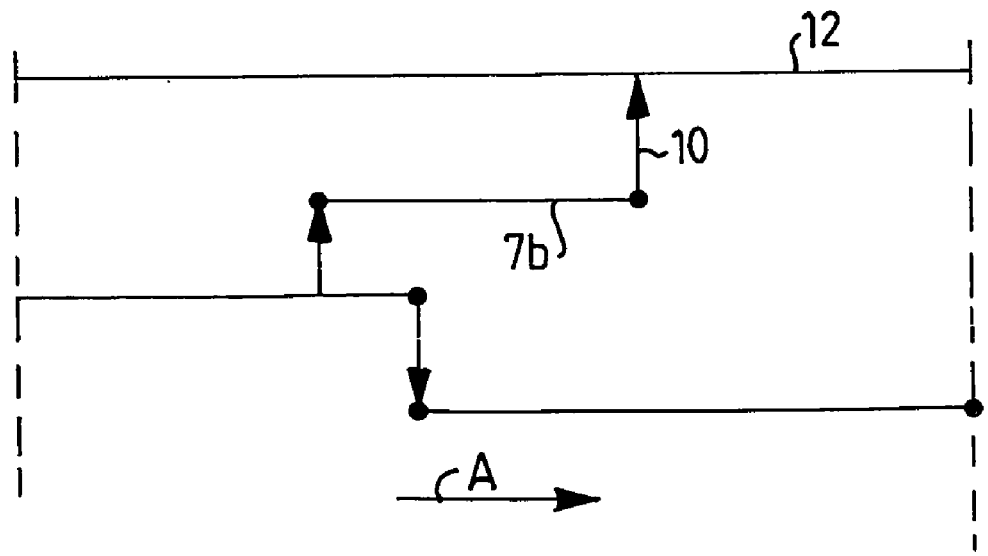

Referring to FIG. 5, in an alternative embodiment, a special no operation row 12 in the memory 4 is used by the linker, whereby leaf sequences 7b in execution paths being shorter than the longest execution path, can jump by means of a relocation object 10, to the no operation row 12 when finished. It is important that said jump is carried out to the correct position in the no operation row 12 so that execution paths become equally long.

Figure 6:
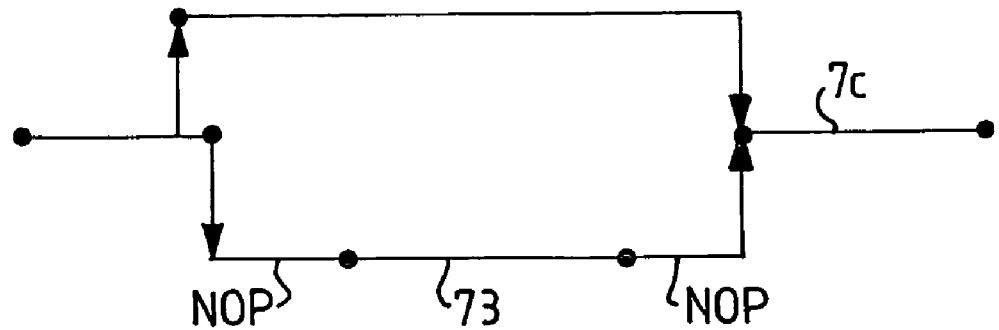

FIG. 6 depicts a situation where alternative execution paths are to be synchronized to a shared sequence 7c. The linker moves a sequence 73 in a path being shorter than the longest execution path, and enters state preserving operations NOP before and after the moved sequence 73.

Figure 7:
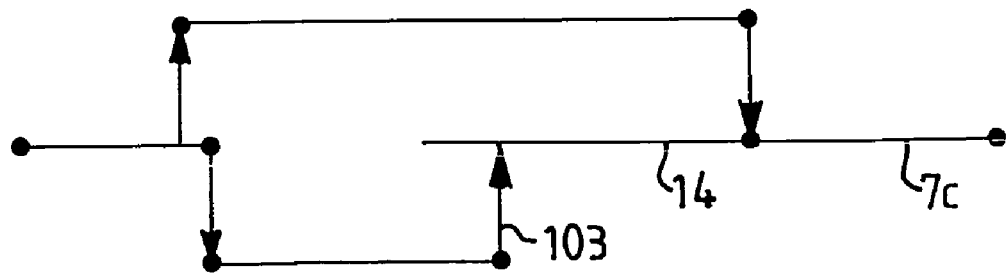

FIG. 7 depicts an alternative to the method described with reference to FIG. 6. The linked can add a no operation sequence 14 on the same row as, but before the shared sequence 7c. A relocation object 103 is entered to make the shorter execution path jump to the no operation sequence 14 before entering the shared sequence 7c. This provides for an easier programming of the processor, since any execution path being shorter than the longest one, can be extended to correspond the latter simply by entering a relocation object at its end pointing to the defined no operation sequence 14, or, referring to FIG. 5, the no operation row 12.

The invention guarantees that the packet program maintains its state to the next engine application point (EAP) even after the packet program has exit. The linker can use a super root with the length of zero instruction as the root for all packet programs, which makes the graph operations more easy.

As has been described the invention provides for the sequences to be moved and the state preserving operations to be entered in such way that sequences that are dependent on each other are synchronized.

Above, the invention has been described pointing out its usefulness for a program code for a pipelined processing system, such as a PISC processor. However, the invention is suited for program codes for any hard real-time system, e.g. on a traditional processor, where the exact execution time is critical.

The invention claimed is:

1. A method for linking program code in a processor instruction memory comprising rows and columns, the program code comprising a plurality of instructions for processing data packets in a communications network, the method comprising:
    dividing the program code into a plurality of sequences, each sequence comprising a number of instructions steps and being configured to perform a certain task on a data packet passing through the communications network;
    defining, based on the program code, a plurality of relocation objects, each relocation object of the plurality of relocation objects corresponding to a dependency relationship between two or more of the sequences;
    allocating each sequence to at least one row and at least one column of the processor instruction memory such that the instruction steps of the sequence are consecutively allocated in the processor instruction memory;
    linking a first sequence to a second sequence by using a defined relocation object corresponding to a dependency relationship between the first sequence and the second sequence to define a branch from the first sequence to the second sequence;
    forming at least one directed graph, based on at least some of the sequences and at least some of the relocation objects, and determining a longest execution path through the directed graph; and
    entering in the processor instruction memory in a shorter of the at least two execution paths a null instruction, so as to make the at least two execution paths equally long,
    wherein the length of the at least two execution paths correspond at least to the length of the longest execution path.

2. The method according to claim 1, comprising the step of moving at least one sequence in the instruction memory.

3. The method according to claim 1, comprising the step of determining the existence of any circle reference by any of the relocation objects between any of the sequences.

4. The method according to claim 1, comprising the step of linking at least one sequence, obtained by the step of dividing the program code, to a sequence, obtained by dividing another program code.

5. A processing system for linking program code in a processor instruction memory comprising rows and columns, the processing system comprising:
    an assembler comprising program code, comprising a plurality of instructions for processing data packets in a communication network wherein the assembler being adapted to:
        divide the program code into a plurality of sequences, each sequence comprising a number of instruction steps and being configured to perform a certain task on a data packet passing through the communications network, and
        define, based on the program code, a plurality of relocation objects, each relocation object of the plurality of relocation objects corresponding to a dependency relationship between two or more of the sequences,
    a processor comprising:
    a linker being adapted to:
    allocate each sequence to at least one row and at least one column of the processor instruction memory, such that the instruction steps of the sequence is consecutively allocated in the processor instruction memory; and
    linking a first sequence to a second sequence by using a defined relocation object, corresponding to a dependency relationship between the first sequence and the second sequence to define a branch from the first sequence to the second sequence,
    wherein, the assembler is adapted to form at least one directed graph, based on at least some of the sequences and at least some of the relocation objects, and the linker is adapted to determine a longest execution path through the directed graph,
    the linker is adapted to enter in the processor instruction memory in a shorter of the at least two execution paths a null instruction, so as to make the at least two execution paths equally long, and
    the length of the at least two execution paths correspond at least to the length of the longest execution path.

6. The processing system according to claim 5, wherein the linker is adapted to move at least one sequence in the instruction memory.

7. The processing system according to claim 5, wherein the linker is adapted to determine the existence of any circle reference by any of the relocation objects between any of the sequences.

8. The processing system according to claim 5, wherein the linker is adapted to link at least one sequence, obtained by dividing the program code, to a sequence, obtained by dividing another program code.

9. The method according to claim 1, wherein the allocating each sequence to at least one row and at least one column of the processor instruction memory such that the instruction steps of the sequence are consecutively allocated in the processor instruction memory is performed by allocating each instruction step of the sequence to the same row but in different columns of the processor instruction memory.

10. The processing system according to claim 5, wherein the allocating each sequence to at least one row and at least one column of the processor instruction memory is performed by allocating to the same row but in different columns.

* * * * *